United States Patent
Kanda

[11] Patent Number: 5,123,633
[45] Date of Patent: Jun. 23, 1992

[54] FLUID-FILLED ELASTIC ROTATIONAL COUPLING HAVING TWO FLUID CHAMBERS ON EACH SIDE OF WING MEMBERS

[75] Inventor: Ryouji Kanda, Komaki, Japan

[73] Assignee: Tokai Rubber Industries, Ltd., Japan

[21] Appl. No.: 659,083

[22] Filed: Feb. 22, 1991

[30] Foreign Application Priority Data

Feb. 27, 1990 [JP] Japan .................... 2-46576

[51] Int. Cl.$^5$ .................... F16F 5/00; F16D 3/80
[52] U.S. Cl. .................... 267/140.1 R; 464/24; 267/141.2
[58] Field of Search .............. 267/140.1 C, 140.1 R, 267/141.2; 464/24, 28, 82, 87, 180, 904; 74/573 F, 574, 583; 248/562, 636

[56] References Cited

U.S. PATENT DOCUMENTS

| | | | |
|---|---|---|---|
| 4,588,174 | 5/1986 | Konishi | 267/141.2 |
| 4,619,627 | 10/1986 | Balken et al. | 464/24 |
| 4,749,174 | 6/1988 | Kanda | 267/140.1 |
| 4,817,926 | 4/1989 | Schwerdt | 267/141.2 X |
| 4,919,401 | 4/1990 | Yano | 267/140.1 |
| 4,921,229 | 5/1990 | Hori | 267/140.1 |
| 4,944,482 | 7/1990 | Bouhier et al. | 267/140.1 X |
| 5,007,304 | 4/1991 | Ide | 74/573 F |

FOREIGN PATENT DOCUMENTS

| | | | |
|---|---|---|---|
| 51-143158 | 12/1976 | Japan . | |
| 0164833 | 6/1989 | Japan | 267/141.2 |
| 0279129 | 11/1989 | Japan | 267/141.2 |

Primary Examiner—Joseph F. Peters, Jr.
Assistant Examiner—Carla Mattix
Attorney, Agent, or Firm—Parkhurst, Wendel & Rossi

[57] ABSTRACT

A fluid-filled elastic rotational coupling including an inner and an outer sleeve fixed to one and other of a driving and a driven rotary member, an intermediate sleeve disposed in concentric and radially outwardly spaced relation with the inner sleeve, a pair of wings extending diametrically opposite parts of the inner sleeve toward the intermediate sleeve, an elastic body interposed between the inner and intermediate sleeves and having two pairs of pockets each pair being formed on opposite sides of each wing as viewed in the circumferential direction of the coupling, and a sealing rubber layer between the intermediate and outer sleeves. The outer sleeve closes the pockets to thereby provide two pairs of fluid chambers. An orifice passage is provided between the intermediate and outer sleeves, for fluid communication between each pair of fluid chambers whose fluid pressures change in opposite direction upon relative rotation of the inner and outer sleeves.

14 Claims, 5 Drawing Sheets

FLUID-FILLED ELASTIC ROTATIONAL COUPLING HAVING TWO FLUID CHAMBERS ON EACH SIDE OF WING MEMBERS

BACKGROUND OF THE INVENTION

1. Field of the Invention

The present invention relates in general to an elastic rotational coupling interposed between two rotating members for power transmission therebetween. More particularly, this invention is concerned with a fluid-filled elastic rotational coupling for flexible connection of two rotating members so as to effectively minimize the transmission of vibrations therebetween.

2. Discussion of the Prior Art

An elastic rotational coupling is known as a coupling device interposed between a driving rotary member and a driven rotary member so that a rotary motion is transmitted from the driving rotary member to the driven rotary member through the coupling device, while preventing input vibrations from being transmitted between the two members. For example, an elastic rotational coupling is disposed between a steering shaft of a vehicle and an intermediate shaft fixed to a steering gear box of the vehicle, or used as a coupling for a propeller shaft of the vehicle.

Laid-open Publication No. 51-143158 of unexamined Japanese Patent Application discloses an example of such elastic rotational coupling, which has a first sleeve fixed to a driving rotary member, a second sleeve fixed to a driven rotary member, and an elastic body which elastically connects the first and second sleeves, so that the input vibrations are damped based on the elasticity of the elastic body.

In a known elastic rotational coupling which utilizes only the elasticity of the elastic body to provide a vibration damping or isolating function, it is difficult to formulate or tune the elastic body so as to exhibit an optimum vibration damping or isolating characteristic, since the elastic body also functions as a medium through which a torque is transmitted between the driving and driven rotary members. More specifically, the vibration damping or isolating characteristic of the elastic rotational coupling is determined primarily by the dynamic spring constant of the elastic body. This means that the dynamic spring constant of the elastic body should be relatively low to improve the vibration damping or isolating characteristic. On the other hand, the power or torque transmitting characteristic of the coupling is affected by the static spring constant of the elastic body. This means that the static spring constant of the elastic body should be relatively high to improve the power transmitting characteristic or response. Since the dynamic spring constant and the static spring constant usually have a given relationship, it is not possible to lower only the dynamic spring constant. Thus, there has been a need of providing an elastic rotational coupling which exhibits an sufficiently high vibration damping or isolating effect while assuring an excellent power transmitting characteristic or response.

In particular, it is noted that the dynamic spring constant of an elastic body is generally larger than the static spring constant and tends to increase with an increase in the frequency of the input vibrations. Consequently, in the case of a steering coupling interposed between a steering shaft and an intermediate shaft which are respectively fixed to a steering wheel and a steering gear box of a vehicle, for example, there is a problem that input vibrations such as a shimmy having a frequency of about 10–40 Hz cannot be sufficiently damped or isolated, if the static spring constant of the elastic body is set high enough to permit the elastic body to smoothly transmit a rotary movement of the steering wheel to the steering gear with a high response.

SUMMARY OF THE INVENTION

It is therefore an object of the present invention to provide an elastic rotational coupling which is capable of exhibiting improved vibration damping or isolating characteristic while assuring excellent power transmitting capability and response.

The above object may be achieved according to the principle of the present invention, which provides a fluid-filled elastic rotational coupling interposed between a driving and a driven rotary member for flexible connection thereof, comprising: (a) an inner sleeve fixed to one of the driving and driven rotary members; (b) an intermediate sleeve disposed in a concentric and radially outwardly spaced relation with the inner sleeve; (c) a pair of wings extending from diametrically opposite parts of an axially intermediate portion of the inner sleeve, radially outwardly of the inner sleeve toward the intermediate sleeve, such that the inner sleeve and the wings are movable as a unit; (d) an elastic body interposed between the inner sleeve and the intermediate sleeve for elastic connection thereof, so as to surround the pair of wings, the elastic body having two pairs of pockets, each pair consisting of two pockets formed on opposite sides of each of the wings as viewed in a circumferential direction of the coupling, the intermediate sleeve having windows through which two pairs of pockets are open on an outer circumferential surface of the intermediate sleeve; (e) a sealing rubber layer covering the outer circumferential surface of the intermediate sleeve; and (f) an outer sleeve fixed to the other of the driving and driven rotary members. The outer sleeve is fitted on the intermediate sleeve via the sealing rubber layer, so as to fluid-tightly close openings of the two pairs of pockets and cooperate with the pockets to define two pairs of fluid chambers filled with a non-compressible fluid. Each pair of fluid chambers consists of a first chamber and a second chamber whose pressures of the fluid change in opposite directions when the inner and outer sleeves are rotated relative to each other about axes thereof. The outer sleeve, the intermediate sleeve and the sealing rubber layer cooperate with each other to define two orifice passages one of which effects fluid communication between the first and second chambers of one of the two pairs of fluid chambers, and the other of which effects fluid communication between the first and second chambers of the other pair of fluid chambers.

The fluid-filled elastic rotational coupling of the present invention constructed as described above exhibits a sufficiently lowered dynamic spring constant, based on resonance of the non-compressible fluid which is forced to flow through the two orifice passages upon application of vibrations that cause a relative rotation between the inner and outer sleeves. In the present elastic rotational coupling, this sufficiently low dynamic spring constant in the circumferential or rotational direction of the coupling is compatible with a sufficiently high static spring constant in the same direction based on the elasticity of the elastic body. In the known elastic rotational coupling, these two different spring characteristics are not compatible.

It will therefore be understood that the vibrations applied in the circumferential direction of the present coupling can be effectively damped or isolated owing to the sufficiently low dynamic spring constant derived from the flow flows through the orifice passages, while a torque or rotary motion can be transmitted between the inner and outer sleeves (driving and driven rotary members) with improved response, through the elastic body exhibiting the sufficiently high static spring constant or stiffness.

The sealing rubber layer may have two serpentine or sinuous grooves formed between the outer and intermediate sleeves, so as to meander between the first and second chambers, for providing two serpentine passages as the two orifice passages each connecting the first and second chambers. This arrangement permits each orifice passage to have a relatively large length, and consequently makes it possible to tune or dimension the orifice passage so that the cross sectional area of the passage is accordingly large. This results in a relatively large volume of the fluid flowing through each orifice passage, and an accordingly improved vibration damping or isolating effect based on the resonance of the fluid flows.

The fluid-filled elastic rotational coupling may further comprise a pair of stops disposed on diametrically opposite sides of the inner sleeve and in contact with the intermediate sleeve and the elastic body. Each stop has two portions which are opposed to the pair of wings, respectively, via respective portions of the elastic body in which the two fluid chambers are formed on the same side of the wings. In the presence of these stops, the amount of rotation of the two wings relative to the outer sleeve is limited, to thereby limit the amount of relative rotation between the inner and outer sleeves. This improves the torque transmitting characteristic or response of the present rotational coupling. Further, the stops function to prevent an excessive amount of deformation (elongation) of the elastic body by the wings, thereby improving the durability or life expectancy of the elastic body.

BRIEF DESCRIPTION OF THE DRAWINGS

The above and other objects, features and advantages of the present invention will be better understood by reading the following detailed description of a presently preferred embodiment of the present invention, when considered in connection with the accompanying drawings, in which.

DETAILED DESCRIPTION OF THE PREFERRED EMBODIMENTS

Figure 1:
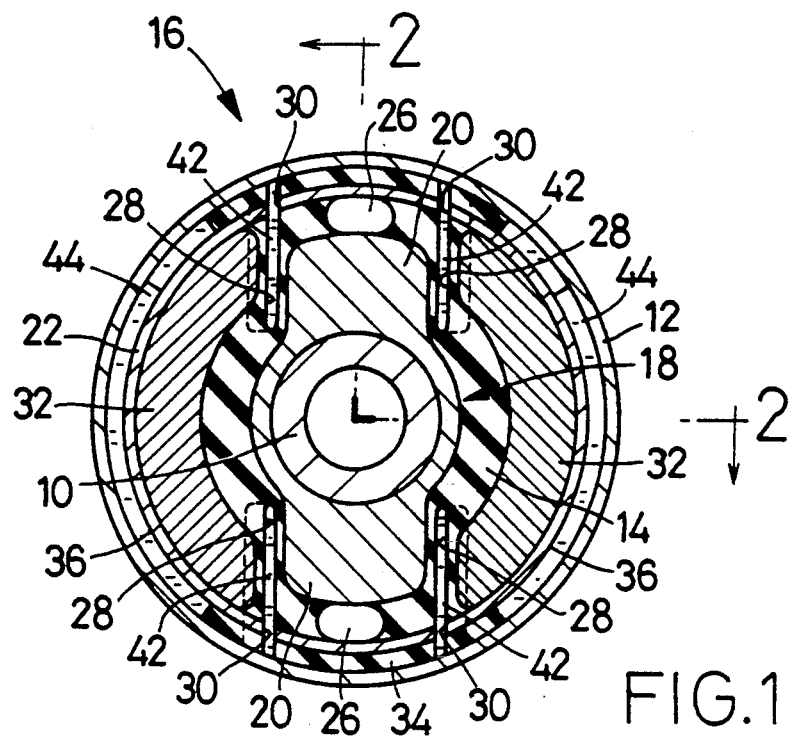
FIG. 1 is an elevational view in transverse cross section of a fluid-filled elastic steering coupling constructed according to one embodiment of of this invention.
Figure 2:
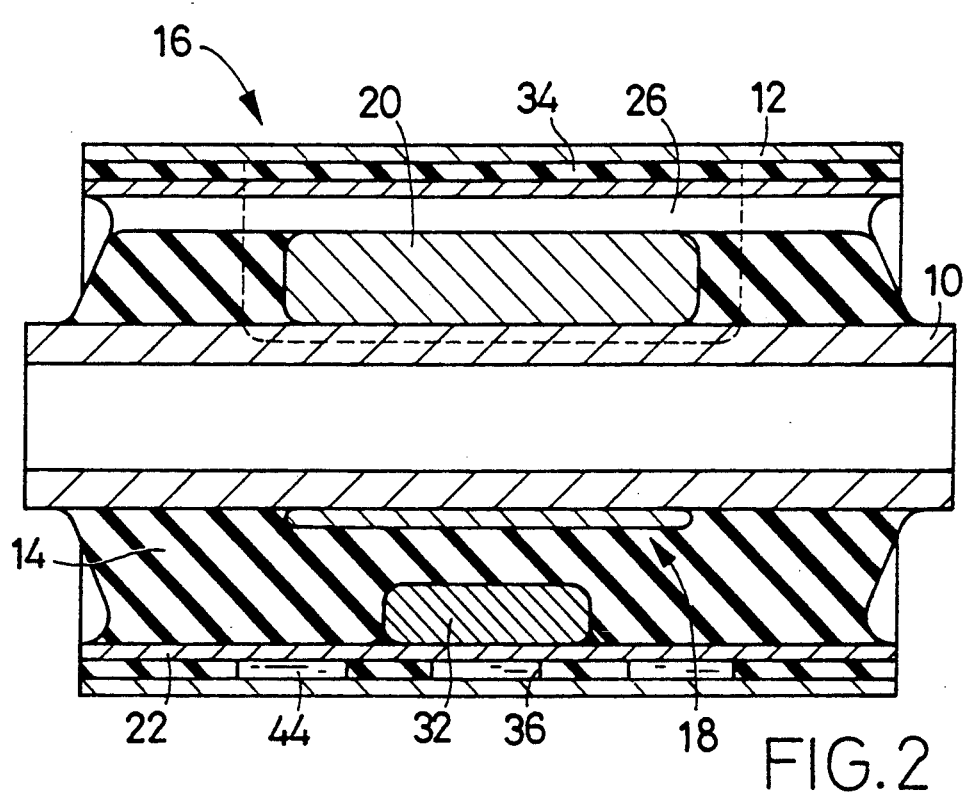
FIG. 2 is an elevational view in axis cross section taken along line 2—2 of FIG. 1.

Referring first to FIGS. 1 and 2, there is shown a fluid-filled elastic rotational coupling in the form of a steering coupling generally indicated at 16, which embodies the present invention. The steering coupling is interposed between a steering shaft as a driving rotary member fixed to a steering wheel of a motor vehicle, and an intermediate shaft as a driven rotary member fixed to a steering gear box of the vehicle. In FIGS. 1 and 2, reference numeral 10 designates an inner sleeve made of a metal. Radially outwardly of the inner sleeve 10, there is disposed an outer sleeve 12 also made of a metal, such that the two sleeves 10, 12 are concentric or coaxial with each other, with a suitable radial spacing. These inner and outer sleeves 10, 12 are elastically connected as a unit by an elastic body 14 formed therebetween. The steering coupling 16 is installed such that the steering shaft is fixedly inserted through the bore of the inner sleeve 10, while the intermediate shaft fixed to the steering gear box is fixedly fitted on the outer sleeve 12, so that the steering shaft is flexibly connected to the intermediate shaft through the elastic body 14.

The inner sleeve 10 has a relatively small diameter and a relatively large wall thickness, and is provided with a wing member 18 which is formed of a metal and has a central bore. The wing member 18 is press-fitted on an axially intermediate portion of the inner sleeve 10. The elastic body 14 is formed so as to surround the wing member 18. The wing member 18 has a pair of wings 20 which extend from diametrically opposite parts of the axially intermediate portion of the inner sleeve 10, in a radially outward direction such that the end faces of the wings 20 face the inner circumferential surface of the outer sleeve 12. Each wing 20 has a suitably determined radial dimension as measured from the outer surface of the inner sleeve 10.

Radially outwardly of the inner sleeve 10, the wing member 18 and the elastic body 14, there is disposed an intermediate sleeve 22 whose diameter is considerably larger than that of the inner sleeve 10 but is smaller than that of the outer sleeve 12. The intermediate sleeve 22 is positioned concentrically or coaxially with the inner and outer sleeves 10, 12, with suitable radial spacings therebetween.

Figure 3:
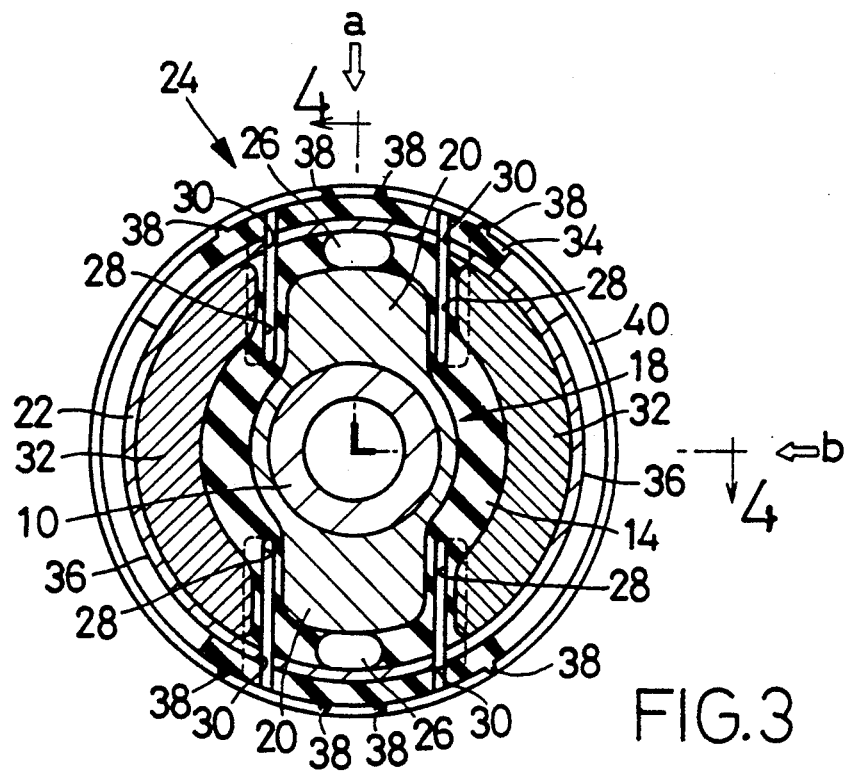
FIG. 3 is an elevational view in transverse cross section of an inner assembly of the steering coupling of FIG. 1, which is prepared in a rubber vulcanization process as an intermediate product during manufacture of the coupling.
Figure 4:
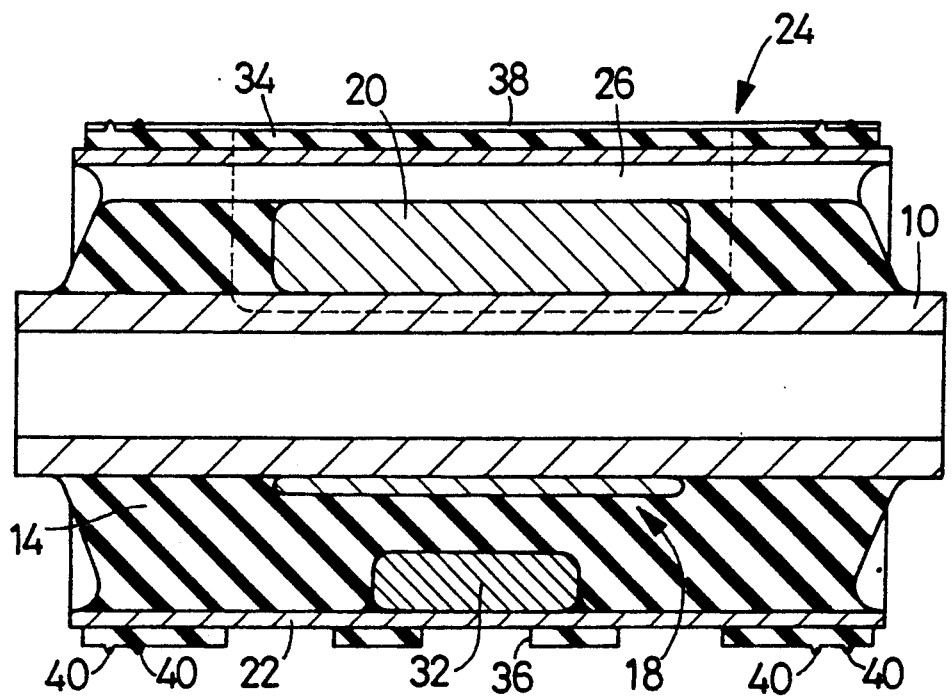
FIG. 4 is an axis cross sectional view taken along line 4—4 of FIG. 3.
Figure 5:
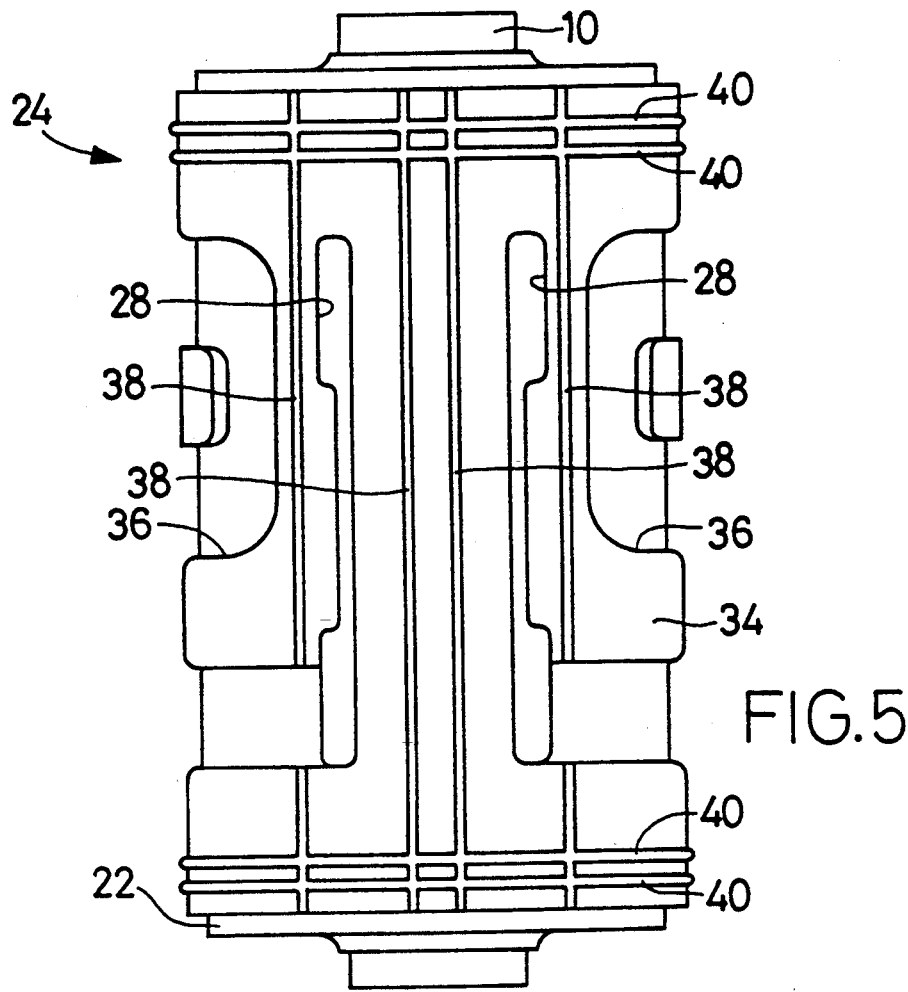
FIG. 5 is a view taken in a direction of arrow "a" of FIG. 3.

In fabricating the present steering coupling 16, an inner assembly indicated generally at 24 in FIGS. 3 through 6 is prepared as an intermediate product, in a process of vulcanizing a rubber material to form the elastic body 14 between the inner and intermediate sleeves 10, 22. As shown in FIGS. 3 and 4, the elastic body 14 is a generally annular member having a comparatively large wall thickness, and connects the inner sleeve 10 (and the wing member 18) and the intermediate sleeve 22 such that the inner and intermediate sleeves 10, 22 are bonded to the inner and outer surfaces of the elastic body 14, respectively.

In the inner assembly 24, portions of the elastic body 14 fill the radial spaces between the end faces of the two wings 20 and the inner circumferential surface of the intermediate sleeve 22. These portions of the elastic body 14 have respective voids 26 formed over the entire length of the elastic body 14, as indicated in FIGS. 2 and 4. These axial voids 26 function to lower the stiffness of the elastic body 14 in the radial directions parallel to the direction of extension of the wings 20. In the absence of the voids 26, the stiffness of the elastic body 14 would be higher in the above-indicated radial directions.

The elastic body 14 of the inner assembly 24 has a total of four pockets 28 i.e., two pockets 28 formed on opposite sides of each of the two wings 20 as viewed in the circumferential direction of the inner and intermediate sleeves 10, 22. The pockets 28 have a depth parallel to the direction of extension of the wings 20, and a relatively large axial length, as most clearly shown in FIG. 5. The intermediate sleeve 22 has four axially formed elongate windows 30. The respective four pockets 28 are open on the outer circumferential surface of the intermediate sleeve 22, through the respective windows 30.

The inner assembly 24 further includes a pair of arcuate stops 32 which are interposed between the intermediate sleeve 22 and the elastic body 14, such that the two arcuate stops 32 are positioned on the diametrically opposite sides of the inner sleeve 10. The arcuate stops 32 are held at its outer surface in fixed contact with the inner circumferential surface of the intermediate sleeve 22 and bonded at its inner surface to each portion of the elastic body 14 located between the two windows 30 between which the wings 20 are not present in the circumferential direction of the sleeves 10, 22. Each of the opposite end portions of each arcuate stop 32 are positioned opposite to one of opposite sides of the corresponding wing 20, via the appropriate portion of the elastic body 14 in which the corresponding pocket 28 is formed. In other words, the two wings 20 are spaced from the corresponding end faces of the arcuate stops 32 by the interposed portions of the elastic body 14, substantially in the circumferential direction of the coupling 16, whereby the amount of rotation of the wing member 18 relative to the intermediate sleeve 22 is limited by the arcuate stops 32. Consequently, the amount of relative rotation between the inner and intermediate sleeves 10, 22 is limited in the presence of the stops 32. The elastic body 14 functions to reduce shocks upon abutting contact of the wings 20 onto the stops 32.

A sealing rubber layer 34 is formed concurrently with the elastic body 14 during the vulcanization process in preparing the inner assembly 24. That is, the sealing rubber layer 34 is formed of the same rubber material as the elastic body 14, so as to cover the substantially entire area of the outer circumferential surface of the intermediate sleeve 22 bonded thereto. The sealing rubber layer 34 has a plurality of sealing lips 38 formed on the outer surface, which extend in the axial direction of the sleeve 22, as shown in FIGS. 3–6. More specifically, two sealing lips 38 are provided on opposite sides of each elongate axial window 30, such that the two sealing lips 38 are spaced apart from each other in the circumferential direction of the sleeve 22, as indicated in FIG. 3. The rubber layer 34 further has a plurality of circumferentially extending sealing lips 40 formed on the outer surface, on each of opposite axial ends thereof, as indicated in FIG. 4.

Figure 6:
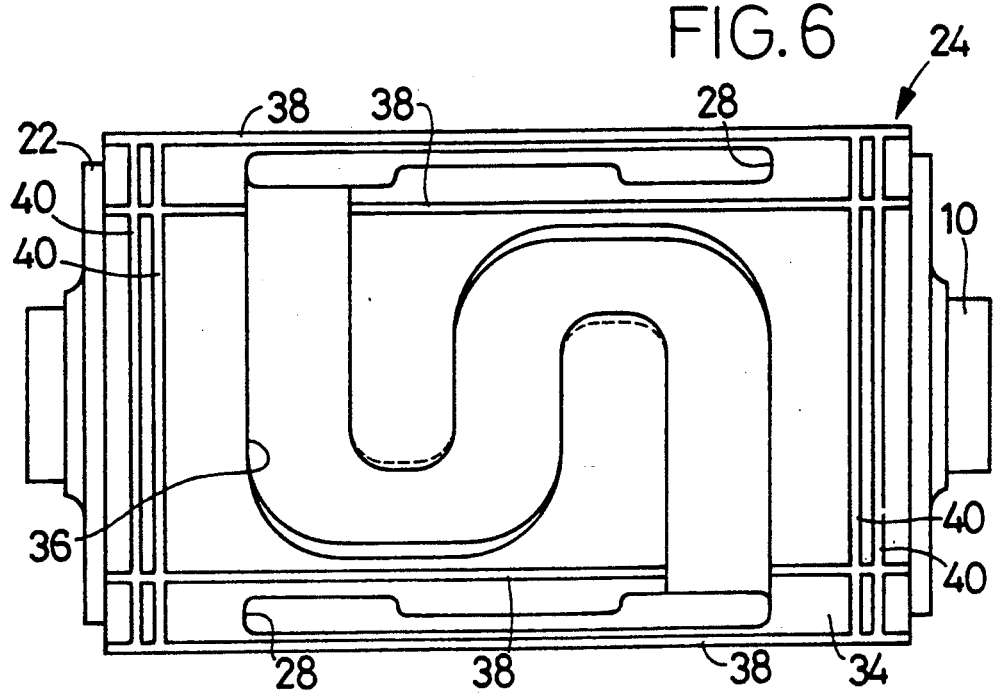
FIG. 6 is a view taken in a direction of arrow "b" of FIG. 3.

The sealing rubber layer 34 also has two serpentine or sinuous grooves 36 in diametrically opposite sides thereof. As shown in FIG. 6, each serpentine groove 36 extends so as to meander between and connect the windows 30 formed in the sleeve 22 for the two pockets 28 which are located adjacent to the opposite ends of the corresponding arcuate stop 32. Because of the serpentine or meandering configuration, the groove 36 have a length which is about 1.5 times the length between the above-indicated two windows 30 as measured in the circumferential direction of the intermediate sleeve 22.

The present steering coupling 16 is prepared by mounting the outer sleeve 12 on the intermediate sleeve 22 of the inner assembly 24, more precisely, on the sealing rubber layer 34, as shown in FIGS. 1 and 2, such that the rubber layer 34 compressed between the intermediate and outer sleeves 22, 12 provides a fluid-tight sealing between these sleeves 22, 12.

With the outer sleeve 12 pressed fitted on the inner assembly 24, the openings of the four pockets 28 are fluid-tightly closed by the outer sleeve 12, whereby four fluid chambers 42 are formed corresponding to the four pockets 28. The fluid chambers 42 are filled with a suitable non-compressible fluid, such as water, alkylene glycol, polyalkylene glycol or silicone oil. Also, the two serpentine grooves 36 formed through the sealing rubber layer 34 are closed by the outer sleeve 12, whereby two orifice passages 44 are provided corresponding to the two grooves 36. Thus, the outer and intermediate sleeves 12, 22 and the sealing rubber layer 34 cooperate to define the two orifice passages 44 each of which communicates with the two fluid chambers 42 adjacent to the ends of each arcuate stop 32, so that the non-compressible fluid may flow between these two fluid chambers 42 through the appropriate orifice passage 44. The fluid chambers 42 and the orifice passages 44 are filled with the fluid, by mounting the outer sleeve 12 on the inner assembly 24 within a mass of the selected fluid, for example.

When a vibrational load is applied between the steering and intermediate shafts of the vehicle steering system in the circumferential or rotational direction of these shafts, the inner and outer sleeves 10, 12 fixed to the steering and intermediate shafts are rotated relative to each other, with the wing member 18 rotated with the inner sleeve 10 relative to the outer sleeve 12. As a result, the elastic body 14 is elastically deformed with the volumes of the four fluid chambers 42 being increased or decreased, whereby the pressures of the fluid masses in the two fluid chambers 42 connected by each orifice passage 44 change in the opposite directions. Namely, one of the two fluid chambers 42 increases while the other fluid chamber 42 decreases as the volumes of the two fluid chambers 42 are decreased and increased with the displacements of the wings 20 toward and away from the respective two fluid chambers 42. Consequently, the fluid is forced to flow through the appropriate orifice passage 44 between the relevant two fluid chambers 42.

Thus, the torsional vibration applied to the steering coupling 16 through the steering and intermediate shafts may be effectively damped or isolated, based on the resonance of the fluid flowing through the orifice passages 44. In other words, the dynamic spring constant of the present steering coupling 16 can be suitably lowered with respect to the input vibrations applied in the circumferential direction. The frequency range of the input torsional vibrations to which the present steering coupling 16 exhibits a sufficient lowered dynamic spring constant can be selected by suitably tuning or determining the dimensions such as the length and cross sectional area of the orifice passages 44, depending upon the viscosity of the fluid and the elasticity of the elastic body 14. In the present embodiment, the orifice passages 44 are tuned to provide an excellent vibration damping effect with respect to a shimmy vibration of the steering system having a frequency within a range of about 10-40 Hz, based on the resonance of the fluid flowing through the orifice passages.

It follows from the above description that the present steering coupling 16 is capable of exhibiting a sufficiently low dynamic spring constant based on the fluid flows through the orifice passages 44, with respect to the selected frequency range of the vibrations applied in the rotational direction, while at the same time maintaining a sufficiently high degree of spring stiffness or static spring constant based on the elasticity of the elastic body 14, so as to permit a steering torque to be transmitted from the steering shaft to the intermediate shaft through the elastic body 14.

The present steering coupling 16 is also advantageous in that the initial or nominal vibration damping effect can be relatively stably maintained, since the orifice passages 44 are formed between the metallic outer and intermediate sleeves 12, 22 and are thus protected from deformation thereof upon application of the steering torque or vibrational load.

Figure 7:
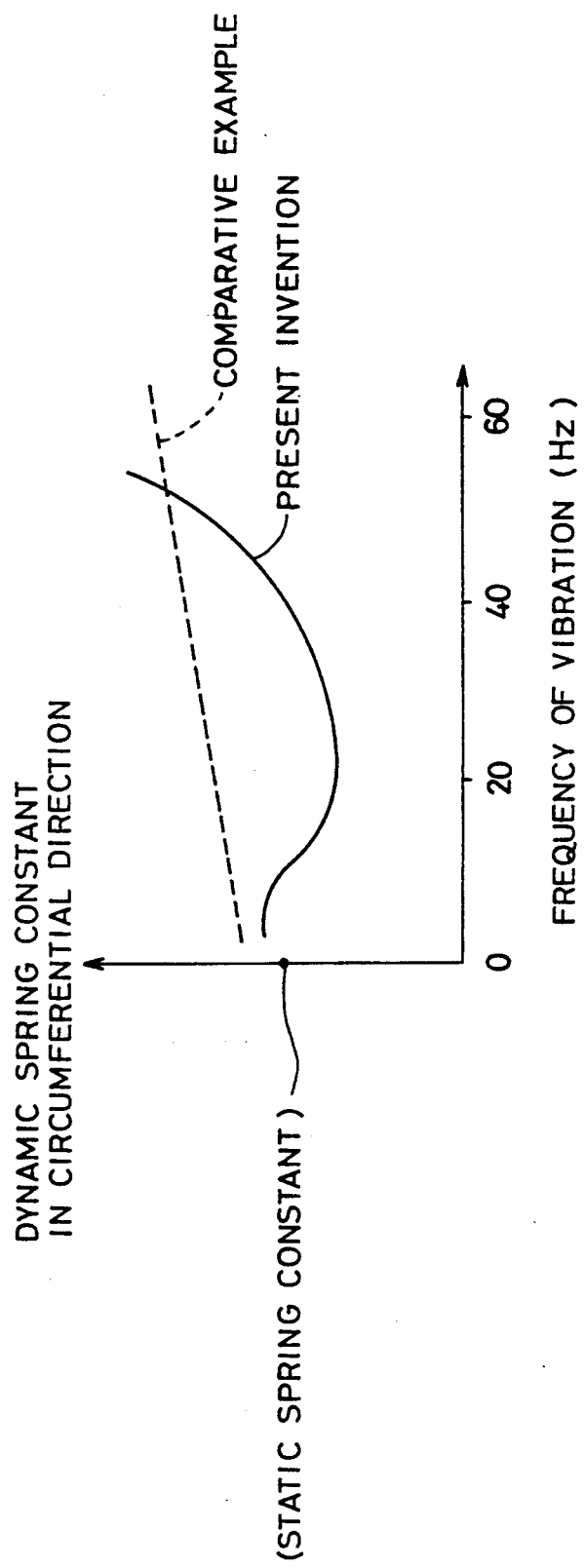
FIGS. 7 and 8 are graphs indicating operating characteristics of the steering coupling of FIG. 1, as compared with those of a comparative example.

An experiment was conducted on the present steering coupling 16, and a comparative example without fluid chambers, to measure the dynamic spring constant varying with the frequency of the vibration applied in the circumferential or torsional direction. The result of the experiment is indicated in FIG. 7. The comparative example used an elastic body having substantially the same static spring constant as the elastic body 14 of the present coupling 16. A further experiment was conducted on the same steering coupling 16 and the same comparative example used in the above experiments of FIG. 7, to measure the acceleration value of the circumferential vibration (shimmy) of the steering wheel which occurred during running of the vehicle whose suspension system was unbalanced by 40g. The result of this experiment is shown in FIG. 8.

Figure 8:
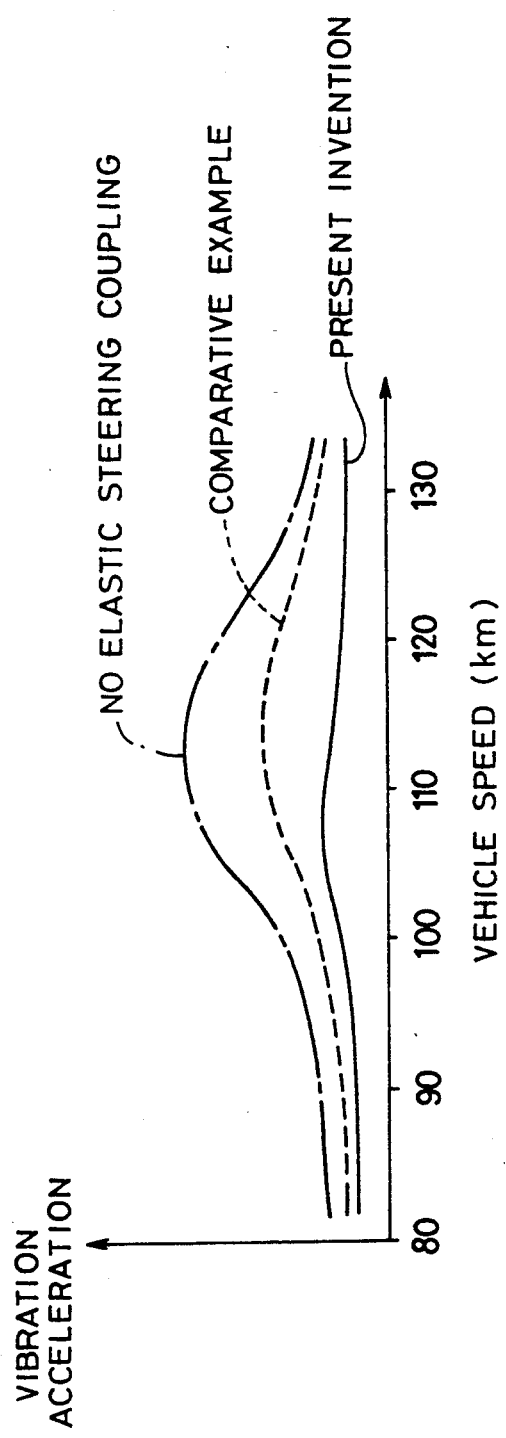

As is apparent from the graphs of FIGS. 7 and 8, the present steering coupling 16 demonstrated a considerably better vibration damping or isolating effect than the comparative example.

It is noted that the tuning of the orifice passages 44 to determine the frequency range of the vibration to be damped by the resonance of the fluid flows through the orifice passages 44 can be effected by suitably adjusting the ratio of the length to the cross sectional area of the passages 44, as well known in the art. In the present steering coupling 16, since the orifice passages 44 have a relatively large length due to their serpentine configuration, the cross sectional area of the passages 44 can be held relatively large to attain the adequate ratio of the length to the cross sectional area and thereby provide a sufficiently low dynamic spring constant with respect to a vibrational load such as a shimmy having a comparatively low frequency (10-40 Hz). The large cross sectional area results in an accordingly large volume of the fluid mass which flows through the orifice passages 44, leading to an improved effect of damping the desired vibration.

It is also noted that the arcuate stops 32 are disposed on the opposite sides of the wings 20 for stopping the wings 20 via the appropriate portions of the elastic body 14 in which the fluid chambers 42 are formed. These stops 32 effective serve to limit or restrict the amount of rotation of the wing member 18 relative to the intermediate sleeve 22, namely, the amount of rotation of the inner sleeve 10 relative to the outer sleeve 12, whereby the steering torque applied from the steering wheel can be transmitted to the steering gear box, with high response to the rotation of the steering wheel, that is, without an excessive amount of loss due to the relative rotation of the inner and outer sleeves 10, 12 (of the steering and intermediate shafts of the steering system). Furthermore, the arcuate stops 32 function to protect the elastic body 14 from excessive deformation upon application of a large torsional load to the steering coupling 16, whereby the durability of the elastic body 14 is improved and the fluid tightness of the coupling 16 is maintained for a prolonged period.

While the present invention has been described in the presently preferred embodiment with a certain degree of particularity, it is to be understood that the invention is not limited to the details of the illustrated embodiment, and that the invention may be otherwise embodied.

For instance, the stops 32 provided on the diametrically opposite sides of the inner sleeve 10 in contact with the intermediate sleeve 22 and the elastic body 14 may be replaced by other stop means having a suitable configuration or construction. Certainly, the wing member 18 may be modified depending upon the adopted stop means. Certainly, the materials of the stop means and the wing member may be suitably selected.

Also, the fluid chambers 42 and the orifice passages 44 may be modified as needed. For example, the orifice passages may be formed so as to extend in the circumferential direction, and the two orifice passages may be tuned differently, to damp or isolate the input vibrations having respective frequency ranges.

In the illustrated embodiment, each orifice passage 44 is adapted to maintain fluid communication between the two fluid chambers 42 (two left-hand side chambers as seen in FIG. 1) which are located adjacent to the same arcuate stop 32 or on the corresponding side of the wing member 18. However, the two fluid chambers 42 (two upper chambers as seen in FIG. 1) located on the opposite sides of each wing 20 may be held in communication with each other by the corresponding orifice passage 44.

While the sealing rubber layer 34 is formed of the same material as the elastic body 14, it is possible to use two different rubber materials for these rubber members, so that the sealing rubber layer 34 has a better sealing function while the elastic body 14 exhibits improved vibration damping and torque transmitting characteristics.

Although the steering coupling 16 used in a steering system of an automotive vehicle is illustrated as one form of the fluid-filled elastic coupling according to the present invention, the principle of the present invention is equally applicable to another other rotational couplings such as a coupling used for an automotive propeller shaft.

It is to be understood that the present invention may be embodied with various other changes, alterations, modifications and improvements, which may occur to those skilled in the art, in view of the foregoing teachings, without departing from the spirit and scope of the invention defined in the following claims.

What is claimed is:

1. A fluid-filled elastic rotational coupling interposed between a driving and a driven rotary member for flexible connection thereof, comprising:

an inner sleeve fixed to one of said driving and driven rotary members;

an intermediate sleeve disposed in a concentric and radially outwardly spaced relation with said inner sleeve;

a pair of wings extending from diametrically opposite parts of an axially intermediate portion of said inner sleeve, radially outwardly of said inner sleeve toward said intermediate sleeve, such that said inner sleeve and said wings are movable as a unit;

an elastic body interposed between said inner sleeve and said intermediate sleeve for elastic connection thereof, so as to surround said pair of wings, said elastic body having two pairs of pockets, each pair consisting of two pockets formed on opposite sides of each of said pair of wings as viewed in a circumferential direction of the coupling, said intermediate sleeve having windows through which two pairs of pockets are open on an outer circumferential surface of said intermediate sleeve;

a sealing rubber layer covering said outer circumferential surface of said intermediate sleeve; and an outer sleeve fixed to the other of said driving and driven rotary members, and fitted on said intermediate sleeve via said sealing rubber layer, so as to fluid-tightly close openings of said two pairs of pockets and cooperate with said pockets to define two pairs of fluid chambers filled with a non-compressible fluid, each of said two pairs of fluid chambers consisting of a first chamber and a second chamber whose pressures of said fluid change in opposite directions when said inner and outer sleeves are rotated relative to each other about axes thereof, said outer sleeve, said intermediate sleeve and said sealing rubber layer cooperating with each other to define two orifice passages one of which effects fluid communication between said first and second chambers of one of said two pairs of fluid chambers, and the other of which effects fluid communication between said first and second chambers of the other said two pairs of fluid chambers.

2. A fluid-filled elastic rotational coupling according to claim 1, wherein said sealing rubber layer has two serpentine grooves formed between said outer and intermediate sleeves, to form two serpentine passages as said two orifice passages each connecting said first and second chambers.

3. A fluid-filled elastic rotational coupling according to claim 1, further comprising a pair of stops disposed on diametrically opposite sides of said inner sleeve and in contact with said intermediate sleeve and said elastic body, each of said pair of stops has two portions which are opposed to said pair of wings, respectively, via respective portions of said elastic body in which two chambers of said two pair of fluid chambers are formed on the corresponding one of said opposite sides of said wings.

4. A fluid-filled elastic rotational coupling according to claim 1, wherein one of said two orifice passages communicates with two chambers of said two pairs of fluid chambers which are formed on one of said opposite sides of said wings, and the other orifice passage communicates with the other two chambers of said two pairs of fluid chambers which are formed on the other of said opposite sides of said wings.

5. A fluid-filled elastic rotational coupling according to claim 1, wherein said pair of wings are fixedly fitted on said axially intermediate portion of said inner sleeve.

6. A fluid-filled elastic rotational coupling according to claim 1, wherein said sealing rubber layer and said elastic body are formed of a same rubber material.

7. A fluid-filled elastic rotational coupling according to claim 1, wherein said elastic body has at least one void located between each of said pair of wings and said intermediate sleeve in a radial direction of said inner and intermediate sleeves.

8. A fluid-filled elastic rotational coupling according to claim 1, wherein said sealing rubber layer has a plurality of sealing lips formed on an outer circumferential surface thereof, so as to extend in an axial direction of the coupling.

9. A fluid-filled elastic rotational coupling according to claim 8, wherein said plurality of sealing lips comprise two lips disposed on opposite sides of each of said fluid chambers as viewed in said circumferential direction.

10. A fluid-filled elastic rotational coupling according to claim 1, wherein said sealing rubber layer has a plurality of sealing lips formed on an outer circumferential surface thereof, so as to extend in said circumferential direction.

11. A fluid-filled elastic rotational coupling according to claim 10, wherein said plurality of sealing lips comprise at least one lip formed on each of axially opposite portions of said sealing rubber layer.

12. A fluid-filled elastic rotational coupling according to claim 1, wherein said driving rotary member is a steering shaft fixed to a steering wheel of a motor vehicle, while said driven rotary member is an intermediate shaft fixed to a steering gear box of the vehicle.

13. A fluid-filled elastic rotational coupling according to claim 12, wherein said inner sleeve is fixed to said steering shaft while said outer sleeve is fixed to said intermediate shaft.

14. A fluid-filled elastic rotational coupling according to claim 12, wherein said two orifice passages are tuned so as to damp a shimmy vibration having a frequency within a range of about 10–40 Hz.

* * * * *